UNITED STATES PATENT OFFICE

2,353,041

DYESTUFFS OF THE ANTHRAQUINONE SERIES

David X. Klein, Wilmington, Del., assignor to E. I. du Pont de Nemours & Company, Wilmington, Del., a corporation of Delaware No Drawing. Application October 24, 1940, Serial No. 362,626

5 Claims. (Cl. 260—367)

This invention relates to the preparation of new dyestuffs of the anthraquinone series and more particularly to the preparation of acid wool dyestuffs which dye in a variety of shades and exhibit good fastness properties.

In the dyes of the anthraquinone acid wool dyestuff series there are known those which are prepared by the condensation of 1-amino-4-anilino-anthraquinone-2-sulfonic acid with formaldehyde under conditions which give a di-molecular condensation product in which it is presumed that diphenyl methane forms the connecting link. It is also known that similar dyes may be produced by condensing 1-amino-4-bromo-2-anthraquinone sulfonic acids with 4,4'-diamino-diphenyl methane. In both of these cases, however, the number of colors that can be produced are limited because due to the nature of the processes employed both sides of the di-molecular condensation product are necessarily identical.

I have found that a number of new colors in this series may be produced by a process in which the arylamine nucleus and the arylaminoanthraquinone nucleus which are connected together by a methane group, are dissimilar in constitution. I have also found that the symmetrical types of dicondensation products heretofore known may be economically produced by this new method.

It is an object of this invention to produce a series of new and valuable dyes of the anthraquinone acid wool series that exhibit good fastness properties and which can be prepared from simple and readily available intermediates.

It is a further object of the invention to provide a simple and economical method for preparing dyes of the arylaminoanthraquinone class in which the arylamine group comprises a diphenyl methane nucleus, and in which the diphenyl methane nucleus may be symmetrically or unsymmetrically substituted by aryl radicals comprising at least one anthraquinonylamino group.

According to the present invention an anilino anthraquinone compound which carries in the para position of the anilino group a methylol radical is condensed with substituted arylamines in which at least one aryl group is of the benzene series and has the position para to the amine group unsubstituted. The condensation is effected by warming the reacting compounds together in an aqueous acid medium, such as with diluted hydrochloric, sulfuric, and acetic acids, etc.

The following examples are given to illustrate the invention. The parts used are by weight.

Example 1

Mix intimately ten parts of 1-amino-4-anilino-2-anthraquinone sodium sulfonate, and 10 parts of 1-amino-4-p-methylol-anilino-2-anthraquinone sodium sulfonate, and add to 180 parts of 60% sulfuric acid. Heat to 60° C. and hold for 4 hours. Filter the suspension and wash with 60% sulfuric acid. Dissolve the cake in 500 parts of water and salt to 4% sodium chloride. The isolated dyestuff is essentially

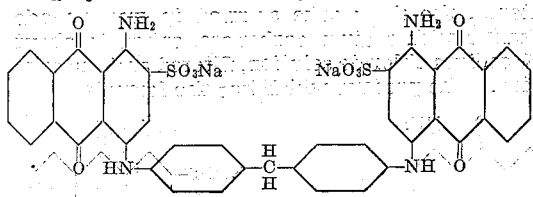

and dyes wool blue shades, fast to fulling and washing.

Example 2

Dissolve in 200 parts of water, 4.46 parts of 1-amino-4-p-methylol-anilino-2-anthraquinone sulfonate of sodium, 3.75 parts of Metanil Yellow

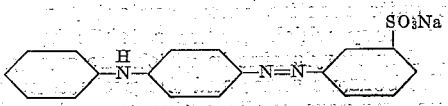

and add 2 parts of glacial acetic acid. Reflux for one hour, and salt to a 4% salt solution. Cool and decant the mother liquor from the precipitated oily compound. Stir the residue with 200 parts of alcohol and filter. Wash with alcohol and dry.

The product is a green dyestuff having good fastness to fulling and washing.

Example 3

Dissolve 4.46 parts of 1-amino-4-p-methylol-anilino-2-anthraquinone sodium sulfonate, and 4.77 parts of 1-amino-4-anilino-5-nitro-2-anthraquinone sodium sulfonate in 200 cc. water at the boil. Add 2 parts of glacial acetic acid, and reflux four hours. Salt to 2% NaCl and cool. Filter and dry the product, which is essentially

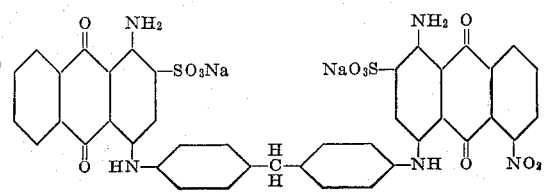

It dyes wool blue-green shades having good fastness to washing and fulling.

Example 4

Add 4.46 parts of 1-amino-4-(p-methylol-anilino)-2-anthraquinone sodium sulfonate, and 4.17 parts of 1-hydroxy-4-anilino-2-anthraquinone sodium sulfonate, to 200 parts of water. Add 2 parts of glacial acetic acid. Reflux four hours. Cool the mass and filter off the crystalline precipitate and wash and dry the filter cake.

The product is presumed to have the formula,

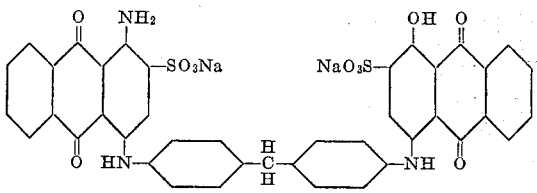

It dyes wool reddish-blue shades of good fastness to fulling and washing.

Example 5

3.44 parts of 1-amino-4-(p-methylol anilino)-anthraquinone and 4.16 parts of 1-amino-4-anilino-2-anthraquinone sodium sulfonate are heated in 100 parts of 80% sulfuric acid at 60° C. for 4 hours with agitation. The mass is cooled and 60 parts of water are added. It is then filtered, the filter cake slurried in water made alkaline with sodium carbonate, salted to about 4% sodium chloride solution, filtered and the cake dried. The product which has the formula

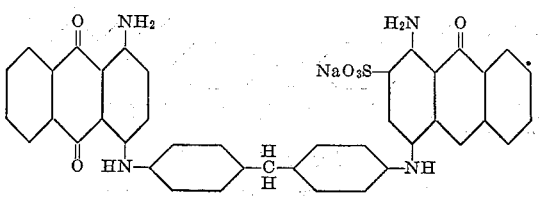

dyes in blue shades.

I have found the para-methylol-anilino group to be quite reactive when contacted with an anilino group which carries a labile hydrogen atom. Any diarylamine in which one aryl group is of the benzene series and the position in such benzene ring para to the amine group is unsubstituted may be condensed with the methylol group of the arylaminoanthraquinone. Neither the p-methylolanilinoanthraquinone nor the diarylamine with which it is condensed need contain a sulfonic acid radical prior to condensation. Where at least one of the anthraquinone groups does not contain a sulfonic acid group the product may be rendered water soluble by sulfonation under the conditions usually employed in sulfonating arylaminoanthraquinones. The arylaminoanthraquinones which carry the sulfonic acid group in the anthraquinone nucleus in other than the 2-position may be substituted for the particular compounds mentioned in the examples to give acid wool dyes of this series.

This process makes possible the preparation of dyes of a wide variety of shades and dyeing properties by varying the second component that goes to make up the molecule. The dimolecular structure in acid wool dyes of this series is found to impart desirable fastness properties, particularly to washing and fulling.

I claim:

1. The process for preparing arylaminoanthraquinone compounds in which the arylamino radical is an amino-diphenyl-methane group, which comprises reacting in aqueous acid medium upon an anilinoanthraquinone which carries a methylol group in the para position of the anilino radical, with a diarylamine in which one aryl group is of the benzene series and is unsubstituted in the position para to the amine group.

2. The process for preparing arylaminoanthraquinone compounds in which the arylamino radical is an amino-diphenyl-methane group, which comprises reacting in aqueous acid medium upon an anilinoanthraquinone which carries a methylol group in the para position of the anilino radical, with an anilinoanthraquinone in which the anilino radical is unsubstituted in the para position.

3. The process for preparing arylaminoanthraquinone sulfonic acids in which the arylamino radical is an amino-diphenyl-methane group, which comprises reacting in aqueous acid medium upon an anilinoanthraquinone sulfonic acid which carries a methylol group in the para position of the anilino radical, with a diarylamine in which one aryl group is of the benzene series and is unsubstituted in the position para to the amine group.

4. The process for preparing arylaminoanthraquinone sulfonic acids in which the arylamino radical is an amino-diphenyl-methane group, which comprises reacting in aqueous acid medium upon an anilinothraquinone sulfonic acid which carries a methylol group in the para position of the anilino radical, with an anilinoanthraquinone in which the anilino radical is unsubstituted in the para position.

5. The process for preparing arylaminoanthraquinone sulfonic acids in which the arylamino radical is an amino-diphenyl-methane group, which comprises reacting in aqueous acid medium upon an anilinoanthraquinone sulfonic acid which carries a methylol group in the para position of the anilino radical, with an anilinoanthraquinone sulfonic acid in which the anilino radical is unsubstituted in the para position.

DAVID X. KLEIN.